United States Patent
Bardalai et al.

(10) Patent No.: US 7,706,306 B2
(45) Date of Patent: Apr. 27, 2010

(54) GENERATING A PATH INVENTORY FOR A COMMUNICATION NETWORK

(75) Inventors: Snigdho C. Bardalai, Plano, TX (US); Richard J. Dunsmore, McKinney, TX (US)

(73) Assignee: Fujitsu Limited, Kawasaki (JP)

(*) Notice: Subject to any disclaimer, the term of this patent is extended or adjusted under 35 U.S.C. 154(b) by 797 days.

(21) Appl. No.: 11/278,175

(22) Filed: Mar. 31, 2006

(65) Prior Publication Data
US 2007/0230362 A1    Oct. 4, 2007

(51) Int. Cl.
*H04L 12/28* (2006.01)
*H04L 12/26* (2006.01)

(52) U.S. Cl. ............ 370/255; 370/235; 370/252; 709/238

(58) Field of Classification Search .......... 370/216, 370/217, 229, 238, 241, 252, 254, 255, 351, 370/389, 395.1, 395.5, 395.3, 235, 395.53; 709/238, 241
See application file for complete search history.

(56) References Cited

U.S. PATENT DOCUMENTS

| | | | |
|---|---|---|---|
| 6,891,937 B1 | 5/2005 | Kuhn et al. | 379/112.01 |
| 7,460,481 B2* | 12/2008 | Vasseur et al. | 370/238 |
| 2002/0141345 A1* | 10/2002 | Szviatovszki et al. | 370/238 |
| 2005/0216383 A1 | 9/2005 | Kuhn et al. | 705/34 |
| 2006/0034297 A1* | 2/2006 | O'Neill | 370/395.53 |
| 2006/0056291 A1* | 3/2006 | Baker et al. | 370/229 |
| 2006/0067210 A1* | 3/2006 | Liu et al. | 370/217 |
| 2007/0047467 A1* | 3/2007 | Enoki et al. | 370/254 |
| 2007/0091868 A1* | 4/2007 | Hollman et al. | 370/351 |

OTHER PUBLICATIONS

"Cisco Transport Manager Delivers the Full Power of Cisco Optical Networking Systems", Data Sheet, Cisco Systems, Inc., www.cisco.com, 3 pages, Printed Mar. 2006.
"Logical Network Inventory™ Network Solutions", Overview, GE Network Solutions, www.gepower.com/prod_serv/products/telecomm_software, 2 pages, Printed Mar. 2006.
"Circuit Inventory", Circuit Inventory Fact Sheet, MBG, www.mbg-inc.com, 2 pages, Printed Mar. 2006.
"Gateway™ Module MetaSolv Circuit Inventory", Spirent Communications, Inc., www.spirentcom.com, 2 pages, Printed Mar. 2006.

* cited by examiner

*Primary Examiner*—Ricky Ngo
*Assistant Examiner*—Paul Masur
(74) *Attorney, Agent, or Firm*—Baker Botts L.L.P.

(57) ABSTRACT

Generating a path inventory for a communication network includes sending a path message through a sequence of nodes of the communication network. The sequence of nodes comprises an initiating node, a set of intermediate nodes, and a terminating node. The path message is sent from the initiating node, through the set of intermediate nodes, to the terminating node. The path message sent from the initiating node may not have a specified destination address. The following is repeated for each node of the set of intermediate nodes: establishing a next node subsequent to the each node, and gathering path information about the next node in the path message. The path message is received at the terminating node, and the path information is recorded in a return message.

26 Claims, 2 Drawing Sheets

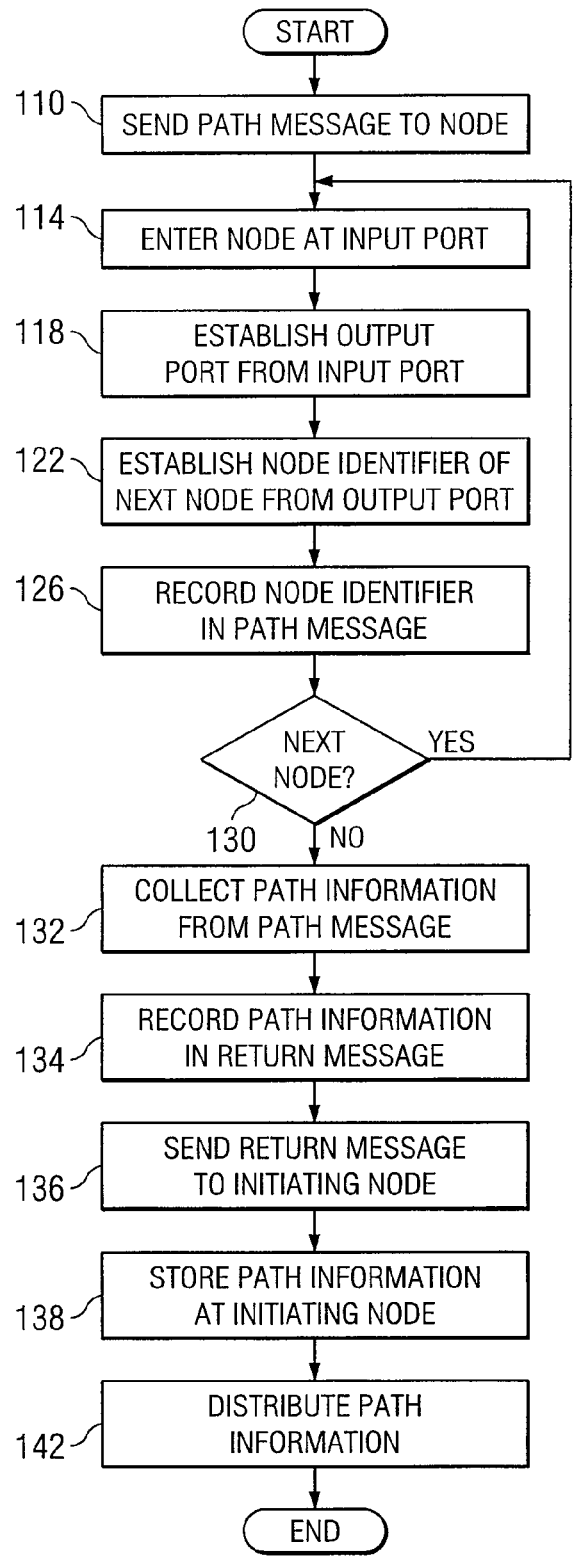

GENERATING A PATH INVENTORY FOR A COMMUNICATION NETWORK

TECHNICAL FIELD

This invention relates generally to the field of communication networks and more specifically to generating a path inventory for a communication network.

BACKGROUND

A communication network includes paths of nodes that route packets through the network. An inventory describing the paths of a network may be generated to keep track of the paths. Known techniques of generating a path inventory include running complicated software programs that trace the paths of the network. Running these software programs, however, may be time consuming. For example, running a program for a network with 100 to 150 network elements may take up to 29 hours. Accordingly, these known techniques are typically not efficient. It is generally desirable to have efficient techniques for generating a path inventory.

SUMMARY OF THE DISCLOSURE

In accordance with the present invention, disadvantages and problems associated with previous techniques for managing connections may be reduced or eliminated.

According to one embodiment of the present invention, generating a path inventory for a communication network includes sending a path message through a sequence of nodes of the communication network. The sequence of nodes comprises an initiating node, a set of intermediate nodes, and a terminating node. The path message is sent from the initiating node, through the set of intermediate nodes, to the terminating node. The following is repeated for each node of the set of intermediate nodes: establishing a next node subsequent to the each node, and gathering path information about the next node in the path message. The path message is received at the terminating node, and the path information is recorded in a return message. According to one embodiment, the path message sent from the initiating node may not have a specified destination address.

Certain embodiments of the invention may provide one or more technical advantages. A technical advantage of one embodiment may be that a path message may be used to gather path information from the nodes of a network. Using a path message to gather path information may provide for more efficient generation of a path inventory. Another technical advantage of one embodiment may be that the path information may be distributed to other nodes of the network using a routing protocol. Using a routing protocol to distribute path information may provide for more efficient distribution of the path information.

Another technical advantage of one embodiment may be that the path information may be gathered when a cross connect is being provisioned. Gathering the path information during provisioning may provide for efficient updating of the path inventory. Another technical advantage of one embodiment may be that the gathered path information may include monitoring information. Gathering the monitoring information may allow the network to be monitored while the path inventory is being generated.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 2 is a flowchart illustrating one embodiment of a method of generating a path inventory that may be used with the network system of FIG. 1.

DETAILED DESCRIPTION OF THE DRAWINGS

Figure 1:
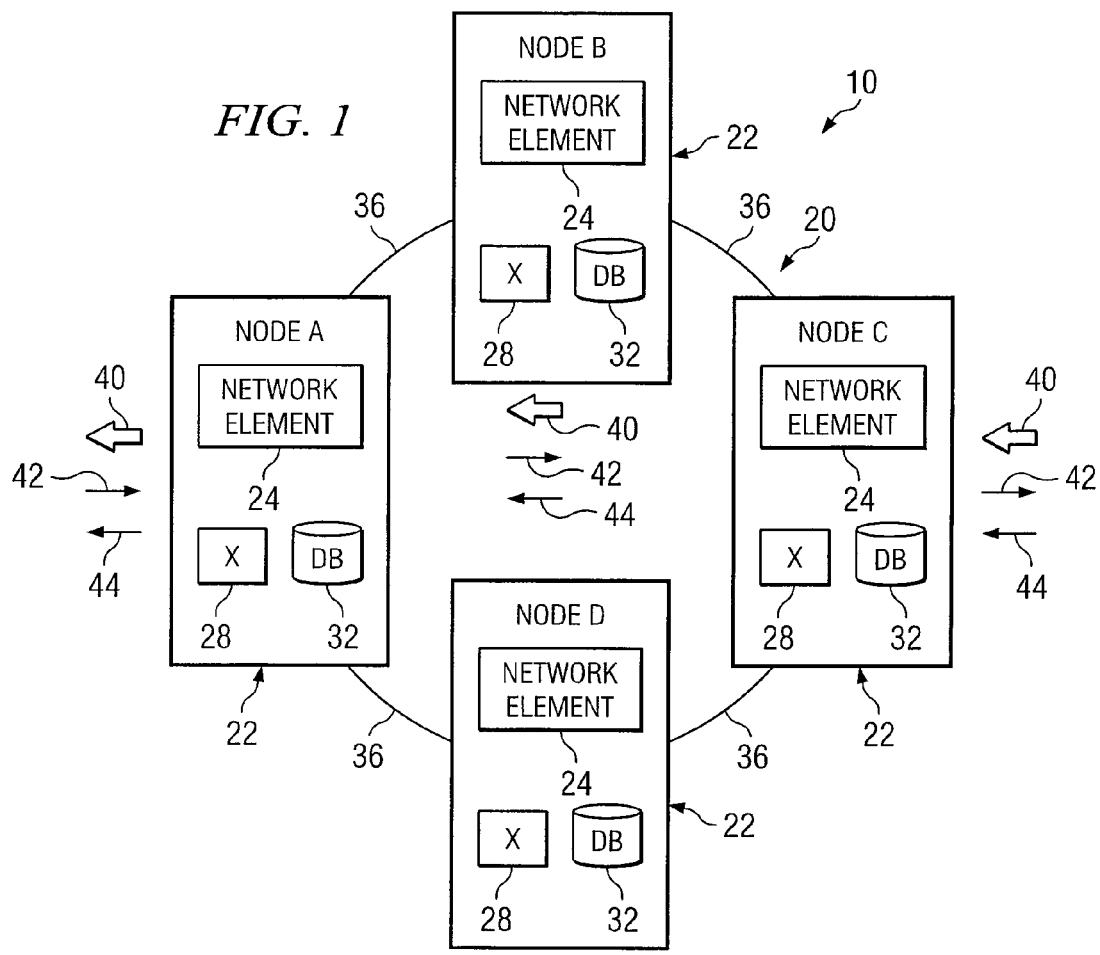
FIG. 1 is a block diagram illustrating a network system for which a path inventory may be created according to one embodiment.
Figure 3:
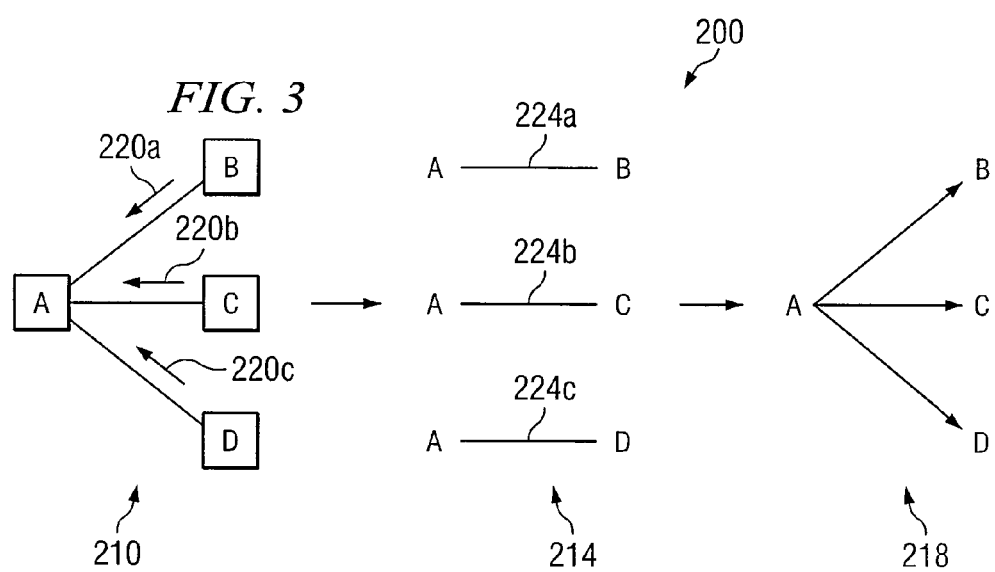
FIG. 3 is a diagram illustrating creation of a path inventory for multicast paths.

Embodiments of the present invention and its advantages are best understood by referring to FIGS. 1 through 3 of the drawings, like numerals being used for like and corresponding parts of the various drawings.

FIG. 1 is a block diagram illustrating a network system 10 for which a path inventory may be created according to one embodiment. According to the embodiment, creation of a path inventory may involve gathering path information describing the paths of network system 10, and distributing the path information through network system 10. Path information may be gathered using a path message, such as a Resource Reservation Protocol (RSVP) path message. The path information may be distributed using a routing protocol, such as the Open Shortest Path First (OSPF) routing protocol.

System 10 includes components such as devices. In general, a device may include any suitable arrangement of components operable to perform the operations of the device. As an example, a device may include logic, an interface, memory, other component, or any suitable combination of the preceding. "Logic" may refer to hardware, software, other logic, or any suitable combination of the preceding. Certain logic may manage the operation of a device, and may comprise, for example, a processor. "Processor" may refer to any suitable device operable to execute instructions and manipulate data to perform operations. "Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

Network system 10 communicates information through signals. A signal may refer to an optical signal transmitted as light pulses. As an example, an optical signal may have a frequency of approximately 1550 nanometers and a data rate of 10, 20, 40, or over 40 gigabits per second. A signal may comprise a synchronous transport signal (STS).

A signal may communicate information in packets. A packet may comprise a bundle of data organized in a specific way for transmission, and a frame may comprise the payload of one or more packets organized in a specific way for transmission. A packet may carry any suitable information such as voice, data, audio, video, multimedia, control, signaling, other information, or any combination of the preceding. The packets may comprise any suitable multiplexed packets, such as time division multiplexed (TDM) packets.

According to the illustrated embodiment, network system 10 includes one or more ring networks 20. A ring network 20 may include nodes 22 coupled by fibers 26 in a ring topology. Ring network 20 may have any suitable topology, for example, a unidirectional path-switched ring (UPSR) topology or a bidirectional line switched ring (BLSR) topology.

According to one embodiment, ring network 20 may comprise an optical fiber ring. Ring network 20 may utilize protocols such as Resilient Packet Ring (RPR) protocols. An RPR protocol may refer to a protocol for ring-based packet transport, where packets are added, passed through, or dropped at each node 22. According to one embodiment, ring network 20 may utilize any suitable transmission technique, such as Ethernet, Synchronous Optical Network (SONET), or wavelength division multiplexing (WDM) (such as dense wavelength division multiplexing (DWDM)) techniques.

A node 22 routes a packet to a next node 22 of a path according to the destination address of the packet. Typically, the destination address specifies a node identifier, such as an Internet Protocol (IP) address, that uniquely identifies a destination node 22. A node 22 may have a table that specifies an output port for a given destination address.

According to the embodiment, a path inventory may refer to a listing of the paths of network system 10. A path, or circuit, may refer to a sequence of nodes 22 comprising endpoint nodes 22 and zero or more intermediate nodes 22 between the endpoint nodes 22. Endpoint nodes 22 may include an initiating node 22 and a terminating node 22. An initiating node 22 may refer to a node 22 at which a packet enters network system 10, and a terminating node 22 may refer to a node 22 at which the packet exits network system 10. Accordingly, a packet may travel from an initiating node 22, through the zero or more intermediate nodes 22, to a terminating node 22. Example path types include unidirectional, bidirectional, drop and continue, broadcast, or multicast path types.

An endpoint node 22 may be identified in any suitable manner. According to one embodiment, a node 22 may be identified as an endpoint node 22 if the node 22 is a network facility, if the node 22 comprises a WDM interface that has no neighbor node 22, or if the node 22 does not have a provisioned cross connect 28.

Traffic 40 may travel in a particular direction of a path. According to the illustrated example, traffic 40 flows from node C through node B to node A. A traffic ingress node 22 may refer to a node 22 at which traffic enters network system 10, and a traffic egress node 22 may refer to a node 22 at which the traffic exits network system 10. Packets may travel in a direction that is reverse of the direction of traffic. A reverse traffic ingress node 22 may refer to a node 22 at which a reverse packet enters network system 10, and a reverse traffic egress node 22 may refer to a node 22 at which the reverse packet exits network system 10.

Path information may refer to information describing one or more paths. As an example, path information may include the sequence of nodes 22 included in a path. According to one embodiment, path information may also include monitoring information. Monitoring information may refer to information that may be used to monitor network system 10. Monitoring information may include, for example, information describing the performance and condition of network system 10.

According to one embodiment, paths may be monitored from endpoint to endpoint during creation of the path inventory. The monitoring information may be gathered in response to a request to collect the monitoring information. According to the embodiment, the monitoring information may be gathered each time path information is collected or only certain times when path information is collected.

A node 22 may include any suitable devices. According to the illustrated embodiment, a node 22 includes a network element 24, a cross connect 28, and a database 32. A network element 24 may include any suitable device operable to route packets to or from ring network 20. Examples of network elements 24 include dense wavelength division multiplexers (DWDMs), access gateways, endpoints, softswitch servers, trunk gateways, access service providers, Internet service providers, or other device operable to route packets to or from ring network 20.

A cross connect 28 may comprise a coupling device that couples connecting hardware on each end. According to one embodiment, fiber patch cords may be used to make the circuit connections. Cross connect 28 may be incorporated with or separate from network element 24. A cross connect 28 may map a specific input port to a specific output port such that a packet received at the input port is routed to the output port. According to one embodiment, this mapping may be used to discover the paths of network system 10.

A database 32 may comprise a device operable to store link state information, for example, a link state database (LSDB). Link state information describes the links and paths of network system 10.

According to one embodiment, a node 22 may include a monitor 38. Monitor 38 may be used to monitor a path message as it collects path information. According to one embodiment, monitor 38 may include a graphical user interface that displays trace values at intermediate nodes 22.

Fibers 36 may refer to any suitable fiber operable to transmit a signal. According to one embodiment, a fiber 36 may represent an optical fiber. An optical fiber typically comprises a cable made of silica glass or plastic. The cable may have an outer cladding material around an inner core. The inner core may have a slightly higher index of refraction than the outer cladding material. The refractive characteristics of the fiber operate to retain a light signal inside of the fiber.

A ring network 20 may have any suitable number of fibers 36, for example, two fibers 36. As an example, the first fiber 36 traverses a ring network 20 in one direction, and the second fiber traverses ring network 20 in the other direction. A ring segment may refer to the portion of fibers 36 between network elements 24, and may be designated by the specific ports of network elements coupled by the ring segment.

According to one embodiment of operation, creation of a path inventory may involve gathering path information describing the paths of network system 10, and distributing the path information through network system 10. Path information may be gathered by sending path message 42 from an initiating node 22, through zero or more intermediate nodes 22, to a terminating node 22.

Path message 42 may travel in any suitable direction through nodes 22, for example, in the direction of the flow of traffic 40 or opposite to the direction of the flow of traffic 40. According to one embodiment, a path message 42 travels in a direction opposite the flow of traffic 40. That is, path message 42 may be sent from a reverse ingress node 22, through one or more intermediate nodes 22, to a reverse egress node 22.

Path message 42 gathers path information as it passes through nodes 22 from an initiating node 22 to a terminating node 22. The path information may be gathered according to any suitable method. An example method is described with reference to FIG. 2. Terminating node 22 collects the gathered path information, and sends the path information back to initiating node 22 in a return message 44. The path information may be stored at databases 32 of initiating node 22.

In one example, the path and return messages may perform other operations in addition to gathering path information. In the example, the path and return messages may be used to reserve resources, for example, bandwidth. For example, the path message may comprise an RSVP path message, and the return message may comprise an RSVP reservation-request message.

In the example, the path message may describe requested resources, for example, bandwidth requirements and parameters of data to be sent. The path messages are propagated from an initiating node 22 through intermediate nodes 22 to terminating nodes 22. Each terminating node 22 interested in the data confirms the flow by sending a reservation-request message through the network. The reservation-request message describes the bandwidth characteristics of the data to be received from the initiating node 22. As the reservation-request messages propagate back towards the initiating node 22, intermediate nodes 22 determine whether or not to accept the proposed reservation and commit resources based on their capacity. If an intermediate node 22 decides to accept the proposed reservation, the resources are committed and the reservation-request message is propagated to a next node 22 in the path.

The path information stored at databases 32 may be distributed other nodes 22. According to one embodiment, path information may be distributed using a routing protocol, such as the OSPF routing protocol distribution. As an example, a distribution message may comprise an open shortest path first (OSPF) message.

Modifications, additions, or omissions may be made to network system 10 without departing from the scope of the invention. The components of network system 10 may be integrated or separated according to particular needs. Moreover, the operations of network system 10 may be performed by more, fewer, or other devices. Additionally, operations of network system 10 may be performed using any suitable logic. As used in this document, "each" refers to each member of a set or each member of a subset of a set.

FIG. 2 is a flowchart illustrating one embodiment of a method of generating a path inventory that may be used with network system 10 of FIG. 1. The method may be performed at any suitable time. As an example, discovery may be performed while network elements 24 of nodes 22 are being provisioned.

The method begins at step 110, where path message 42 is sent to a node 22 of network system 10. Node 22 may be an initiating node 22. If path message 42 is traveling against the flow of traffic 40, node 22 may comprise a reverse ingress node 22. Path message 42 may comprise, for example, a RSVP path message. If a destination address is needed in the path message, a random destination address may be supplied, and the path message may be allowed to terminate at an arbitrary node 22. As an example, the path message may be allowed to terminate at a terminating cross connect 28. According to one embodiment, a path message may be distinguished from a regular connection message by a marker identifying the path message.

Path message 42 enters node 22 at an input port of node 22 at step 114. An output port is established from the input port at step 118. A cross connect 28 of node 22 may specify a particular output port for a given input port. A node identifier of a next node 22 is established at step 122. A network element 24 may map a node identifier to an output port. From this mapping, a node identifier may be established from a given output port. The node identifier is recorded in the path message at step 126. According to one embodiment, the hop may be recorded by recording an explicit route (ERO).

The current node 22 may be a terminating node 22. According to one embodiment, a next hop routing (NHR) step may have a flag to inform a core RSVP stack that the current node 22 is a terminating node. If the current node 22 is not a terminating node 22, there may be a next node 22 of the path at step 130. If there is a next node 22, the method returns to step 114, where the path message enters an input port of the next node 22. If there is no next node at step 130, the method proceeds to step 134.

Path information is collected from the path message at step 132. The path information includes the node identifiers of the nodes 22 in the path traveled by the path message. The path information is recorded in a return message at step 134. The return message may comprise a RSVP reservation-request message. The return message is sent to the initiating node 22 at step 136.

The path information is stored at the initiating node 22 at step 138. The path information may be stored at database 32 of initiating node 22. The path information is distributed at step 142. The path information may be distributed using an open shortest path first (OSPF) protocol. The path information may be added to the typical OSPF information that is distributed to a particular set of nodes 22 designated by an OSPF routing area. OSPF may be used to perform additional procedures. For example, OSPF may be used to establish the shortest paths from endpoint node 22 to endpoint node 22.

Modifications, additions, or omissions may be made to the method without departing from the scope of the invention. The method may include more, fewer, or other steps. Additionally, steps may be performed in any suitable order without departing from the scope of the invention.

FIG. 3 is a diagram 200 illustrating creation of a path inventory for multicast paths. According to diagram 200, node A multicasts streams to nodes B, C, and D. Diagram 20 illustrates steps 210, 214, and 218 for generating the path inventory. Path messages are sent from nodes B, C, and D to node A against the direction of traffic at step 210. Path message 220*a* is sent from node B, path message 220*b* is sent from node C, and path message 220*c* is sent from node D.

Path messages 220 record the paths at step 214. Path message 220*a* records path 224*a* between nodes A and B, path message 220*b* records path 224*b* between nodes A and C, and path message 220*c* records path 224*c* between nodes A and D. The paths are merged according to common nodes at step 218. Paths 224*a*, 224*b*, and 224*c* have node A in common. Accordingly, paths 224 are merged to indicate that node A multicasts to nodes B, C, and D.

According to another embodiment, path messages 220 are be sent in the direction of traffic, instead of against the direction of traffic. When a path splits into several branches, the session may be split to multiple sessions, one session for each branch.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that a path message may be used to gather path information from the nodes of a network. Using a path message to gather path information may provide for more efficient generation of a path inventory. Another technical advantage of one embodiment may be that the path information may be distributed to other nodes of the network using a routing protocol. Using a routing protocol to distribute path information may provide for more efficient distribution of the path information.

Another technical advantage of one embodiment may be that the path information may be gathered when a cross connect is being provisioned. Gathering the path information during provisioning may provide for efficient updating of the path inventory. Another technical advantage of one embodiment may be that the gathered path information may include monitoring information. Gathering the monitoring information may allow the network to be monitored while the path inventory is being generated.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for generating a path inventory for a communication network, comprising:
    sending a path message through a sequence of nodes of a communication network, the sequence of nodes comprising an initiating node, a set of intermediate nodes, and a terminating node, the path message sent from the initiating node, through the set of intermediate nodes, to the terminating node;
    repeating the following for each node of the set of intermediate nodes:
        establishing a next node subsequent to the each node; and
        gathering path information about the next node in the path message;
    receiving the path message at the terminating node, the terminating node having a cross connect that has not been provisioned;
    recognizing that the terminating node is the terminating node because the cross connect has not been provisioned, the recognizing independent of an address of the terminating node; and
    recording the path information in a return message.

2. The method of claim 1, wherein:
    the path message comprises a Resource Reservation Protocol (RSVP) path message; and
    the return message comprises an RSVP reservation-request message.

3. The method of claim 1, further comprising:
    sending the return message to the initiating node; and
    recording the path information at the initiating node.

4. The method of claim 1, further comprising:
    distributing the path information to the communication network according to a Open Shortest Path First (OSPF) routing protocol.

5. The method of claim 1, wherein sending the path message through the sequence of nodes of the communication network further comprises:
    sending the path message during provisioning of a network element at the initiating node.

6. The method of claim 1, wherein establishing the next node subsequent to the each node further comprises:
    establishing an output node of a cross connect at the each node, the output node mapped to an input node of the cross connect, the input node used by the path message; and
    determining the next node from the output node.

7. The method of claim 1, wherein establishing the next node subsequent to the each node further comprises:
    establishing an output node corresponding to a destination address of the path message; and
    determining the next node from the output node.

8. The method of claim 1, wherein the path information comprises monitoring information.

9. A communication network operable to generate a path inventory, comprising:
    a sequence of nodes comprising an initiating node, a set of intermediate nodes, and a terminating node, the terminating node having a cross connect that has not been provisioned;
        the initiating node operable to send a path message through the sequence of nodes, the path message sent from the initiating node, through the set of intermediate nodes, to the terminating node;
        each node of the set of intermediate nodes operable to:
            establish a next node subsequent to the each node; and
            gather path information about the next node in the path message; and
        the terminating node operable to:
            receive the path message;
            recognize that the terminating node is the terminating node because the cross connect has not been provisioned and independent of an address of the terminating node; and
            record the path information in a return message.

10. The communication network of claim 9, wherein:
    the path message comprises a Resource Reservation Protocol (RSVP) path message; and
    the return message comprises an RSVP reservation-request message.

11. The communication network of claim 9, wherein:
    the terminating node is further operable to:
        send the return message to the initiating node; and
    the initiating node is further operable to:
        record the path information.

12. The communication network of claim 9, a node of the sequence of nodes further operable to:
    distribute the path information to the communication network according to a Open Shortest Path First (OSPF) routing protocol.

13. The communication network of claim 9, the initiating node further operable to send the path message through the sequence of nodes of the communication network by:
    sending the path message during provisioning of a network element.

14. The communication network of claim 9, each node of the set of intermediate nodes operable to establish the next node subsequent to the each node by:
    establishing an output node of a cross connect at the each node, the output node mapped to an input node of the cross connect, the input node used by the path message; and
    determining the next node from the output node.

15. The communication network of claim 9, each node of the set of intermediate nodes operable to establish the next node subsequent to the each node by:
    establishing an output node corresponding to a destination address of the path message; and
    determining the next node from the output node.

16. The communication network of claim 9, wherein the path information comprises monitoring information.

17. Logic for generating a path inventory for a communication network, the logic embodiment in a medium and operable to:

send a path message through a sequence of nodes of a communication network, the sequence of nodes comprising an initiating node, a set of intermediate nodes, and a terminating node, the path message sent from the initiating node, through the set of intermediate nodes, to the terminating node;

repeat the following for each node of the set of intermediate nodes:
establish a next node subsequent to the each node; and
gather path information about the next node in the path message;

receive the path message at the terminating node, the terminating node having a cross connect that has not been provisioned;

recognize that the terminating node is the terminating node because the cross connect has not been provisioned, the recognizing independent of an address of the terminating node; and record the path information in a return message.

18. The logic of claim 17, wherein:
the path message comprises a Resource Reservation Protocol (RSVP) path message; and
the return message comprises an RSVP reservation-request message.

19. The logic of claim 17, further operable to:
send the return message to the initiating node; and
record the path information at the initiating node.

20. The logic of claim 17, further operable to:
distribute the path information to the communication network according to a Open Shortest Path First (OSPF) routing protocol.

21. The logic of claim 17, further operable to send the path message through the sequence of nodes of the communication network by:
sending the path message during provisioning of a network element at the initiating node.

22. The logic of claim 17, further operable to establish the next node subsequent to the each node by:
establishing an output node of a cross connect at the each node, the output node mapped to an input node of the cross connect, the input node used by the path message; and
determining the next node from the output node.

23. The logic of claim 17, further operable to establish the next node subsequent to the each node by:
establishing an output node corresponding to a destination address of the path message; and
determining the next node from the output node.

24. The logic of claim 17, wherein the path information comprises monitoring information.

25. A system for generating a path inventory for a communication network, comprising:
means for sending a path message through a sequence of nodes of a communication network, the sequence of nodes comprising an initiating node, a set of intermediate nodes, and a terminating node, the path message sent from the initiating node, through the set of intermediate nodes, to the terminating node;
means for repeating the following for each node of the set of intermediate nodes:
establishing a next node subsequent to the each node; and
gathering path information about the next node in the path message;
means for receiving the path message at the terminating node, the terminating node having a cross connect that has not been provisioned;
means for recognizing that the terminating node is the terminating node because the cross connect has not been provisioned, the recognizing independent of an address of the terminating node; and
means for recording the path information in a return message.

26. A method for generating a path inventory for a communication network, comprising:
sending a path message through a sequence of nodes of a communication network, the sequence of nodes comprising an initiating node, a set of intermediate nodes, and a terminating node, the path message sent from the initiating node, through the set of intermediate nodes, to the terminating node, the path message comprising a Resource Reservation Protocol (RSVP) path message, the path message sent during provisioning of a network element at the initiating node;
repeating the following for each node of the set of intermediate nodes:
establishing a next node subsequent to the each node by:
establishing an output node of a cross connect at the each node, the output node mapped to an input node of the cross connect, the input node used by the path message;
establishing the output node corresponding to a destination address of the path message; and
determining the next node from the output node; and
gathering path information about the next node in the path message, the path information comprising monitoring information:
receiving the path message at the terminating node, the terminating node having a cross connect that has not been provisioned;
recognizing that the terminating node is the terminating node because the cross connect has not been provisioned, the recognizing independent of an address of the terminating node;
recording the path information in a return message, the return message comprising an RSVP reservation-request message;
sending the return message to the initiating node; and
recording the path information at the initiating node; and
distributing the path information to the communication network according to a Open Shortest Path First (OSPF) routing protocol.

* * * * *